(12) United States Patent
Sturesson et al.

(10) Patent No.: US 11,021,287 B2
(45) Date of Patent: Jun. 1, 2021

(54) PRESSURE UNIT

(71) Applicant: Tetra Laval Holdings & Finance S.A., Pully (CH)

(72) Inventors: Göran Sturesson, Lund (SE); Mikael Lindstedt, Malmo (SE); Lars Carlsson, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 256 days.

(21) Appl. No.: 16/306,214

(22) PCT Filed: Jun. 1, 2017

(86) PCT No.: PCT/EP2017/063344
§ 371 (c)(1),
(2) Date: Nov. 30, 2018

(87) PCT Pub. No.: WO2017/215940
PCT Pub. Date: Dec. 21, 2017

(65) Prior Publication Data
US 2019/0344914 A1 Nov. 14, 2019

(30) Foreign Application Priority Data
Jun. 14, 2016 (EP) .................................. 16174436

(51) Int. Cl.
*B65B 51/16* (2006.01)
*B29C 65/00* (2006.01)
(Continued)

(52) U.S. Cl.
CPC ............ *B65B 51/16* (2013.01); *B29C 65/368* (2013.01); *B29C 65/3656* (2013.01);
(Continued)

(58) Field of Classification Search
CPC ... B65B 51/16; B65B 51/227; B29C 65/3668; B29C 65/368; B29C 66/43121; B29L 2031/7166
(Continued)

(56) References Cited

U.S. PATENT DOCUMENTS 2,893,468 A * 7/1959 Fieroh ................ B29C 65/7873
156/389
3,218,961 A * 11/1965 Beason, Jr. ....... B29C 66/91216
100/331
(Continued)

FOREIGN PATENT DOCUMENTS

DE 102012223072 6/2014
WO WO 2012-019925 2/2012

OTHER PUBLICATIONS

International Search Report in corresponding PCT Application No. PCT/EP2017/063344 dated Jun. 17, 2017 (3 pages).
(Continued)

*Primary Examiner* — Andrew M Tecco
*Assistant Examiner* — Nicholas E Igbokwe
(74) *Attorney, Agent, or Firm* — Finnegan, Henderson Farabow, Garrett & Dunner LLP

(57) ABSTRACT

The invention relates to a pressure unit (1) for sealing a package (2) for a food product, comprising a conveyor (3) for transporting the package (2) through the pressure unit (1) in a travelling direction (d), a first rotatable pressure roller (11) and a first rotatable anvil roller (21). The first pressure roller (11) is arranged opposite to the first anvil roller (21) to form a first nip (4) for receiving and rotationally engage with a portion (5) of the package, and arranged downstream of the first pressure roller (11) and the first anvil roller (21) in the travelling direction, a second rotatable pressure roller (12) and a second rotatable anvil roller (22). The second pressure roller (12) is arranged opposite to the second anvil
(Continued)

roller (22) to form a second nip (6) for receiving and rotationally engage with the portion (5) of the package. The first anvil roller (21) and the second anvil roller (22), respectively, has a smooth rim surface (25). The first pressure roller (11) comprises a first bulge (15) extending annularly around its rim surface (18), the second pressure roller (12) comprises a second bulge (16) extending annularly around its rim surface (19), and the first bulge (15) is offset in relation to the second bulge (16) in an axial direction (7) of said first pressure roller (11) and the second pressure roller (12).

19 Claims, 2 Drawing Sheets

(51) Int. Cl.
*B29C 65/36* (2006.01)
*B29C 65/78* (2006.01)
*B32B 15/085* (2006.01)
*B32B 15/12* (2006.01)
*B32B 15/20* (2006.01)
*B65B 51/22* (2006.01)
*B29L 31/00* (2006.01)

(52) U.S. Cl.
CPC ...... *B29C 65/3668* (2013.01); *B29C 65/7841* (2013.01); *B29C 65/7867* (2013.01); *B29C 66/342* (2013.01); *B29C 66/43121* (2013.01); *B29C 66/71* (2013.01); *B29C 66/72321* (2013.01); *B29C 66/72328* (2013.01); *B29C 66/72341* (2013.01); *B29C 66/73921* (2013.01); *B29C 66/81465* (2013.01); *B29C 66/83413* (2013.01); *B29C 66/849* (2013.01); *B32B 15/085* (2013.01); *B32B 15/12* (2013.01); *B32B 15/20* (2013.01); *B65B 51/227* (2013.01); *B29L 2031/7166* (2013.01); *B32B 2307/31* (2013.01); *B32B 2307/7242* (2013.01); *B32B 2439/70* (2013.01)

(58) Field of Classification Search
USPC .............................. 53/476, 477, 479, 374.4
See application file for complete search history.

(56) References Cited

U.S. PATENT DOCUMENTS

| | | | | |
|---|---|---|---|---|
| 5,809,743 | A * | 9/1998 | Ylonen | B65B 51/144 53/370.6 |
| 6,764,576 | B1 * | 7/2004 | Heinonen | B29C 66/43122 156/379.7 |
| 8,484,937 | B1 * | 7/2013 | Gabriel | B65B 25/068 53/479 |
| 2002/0189206 | A1 * | 12/2002 | Capodieci | B29C 66/4312 53/450 |
| 2011/0167763 | A1 * | 7/2011 | Waldherr | B29C 66/92451 53/371.8 |

OTHER PUBLICATIONS

European Search Report in corresponding European Application No. 161744362.2 dated Dec. 20, 2016 (7 pages).

* cited by examiner

PRESSURE UNIT

CROSS-REFERENCE TO RELATED PATENT APPLICATIONS

This is a National Phase of International Application No. PCT/EP2017/063344, filed Jun. 1, 2017, which claims the benefit of European Application No. 16174436.2 filed Jun. 14, 2016. The entire contents of the above-referenced applications are expressly incorporated herein by reference.

TECHNICAL FIELD

The invention relates to pressure unit for sealing a package for a food product. More particular, the invention relates to a pressure unit according to the introductory parts of claim 1. The invention further relates to a method for sealing a package for a food product using such a pressure unit.

BACKGROUND ART

Many pourable food products, such as fruit juice, UHT milk, wine, tomato sauce, etc., are sold in packages made of sterilized packaging material.

A typical example of this type of package is the parallelepiped-shaped package for liquid or pourable food products made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging units, on which the packages .e.g. are made by sheets, arriving pre-folded to a cylinder and sealed along a longitudinal overlap, the cylinders having crease lines to enable a rectangular cross-section. This cylinder is then transversally sealed and folded at its top so as to form a receptacle for food placing the open bottom upwards.

The next steps are to pour food into the package and seal the bottom portion with a transversal sealing to fully enclose the food in the package.

In such automated machines the packages or pre-stages thereof are often moved along conveyor lines. While being transported in these conveyor lines the bottom and top transversal sealings are made without stopping the transportation of the packages.

The sealing units for performing the seal of the bottom and top of the package is made by sliding the portions that are to be sealed by a longitudinal induction heating device while pressing the edges that are to be sealed together between a row of pressure roller that apply a pressure onto the portions of the packages with support of a row of anvil roller on the other side of the portions of the packages that are to be sealed. On these roller there has traditionally been a placed an annular bulge or ridge for locally applying a higher pressure along a line in the sealing resulting in a recess in the sealing running as a line along the transversal sealing.

It has been discovered that transversal sealing in automated machines of the above, where sealings are made by sliding the package through a sealing unit, sometimes have the drawback that air is trapped in the sealing weakening the seal. It is thus a need for improvements in these kinds of sealing devices.

SUMMARY OF THE INVENTION

It is an object of the present invention to mitigate, alleviate or eliminate one or more of the above-identified deficiencies in the art and disadvantages singly or in any combination and solve at least the above mentioned problem.

According to a first aspect, these and other objects are achieved in full, or at least in part, by a pressure unit for sealing a package for a food product, comprising a conveyor for transporting said package through the pressure unit in a travelling direction. The pressure unit further comprises a first rotatable pressure roller and a first rotatable anvil roller, wherein the first pressure roller is arranged opposite to the first anvil roller to form a first nip for receiving and rotationally engage with a portion of the package, and arranged downstream of the first pressure roller and the first anvil roller in the travelling direction, and a second rotatable pressure roller and a second rotatable anvil roller, the second pressure roller being arranged opposite to the second anvil roller to form a second nip for receiving and rotationally engage with the portion of the package. The first pressure roller comprises a first bulge extending and annularly around its rim surface, and the second pressure roller comprises a second bulge extending annularly around its rim surface. The first bulge is offset in relation to the second bulge in an axial direction of the first pressure roller and the second pressure roller. The first anvil roller and the second anvil roller, respectively, may have a substantially smooth rim surface.

By the offset in the bulge position the bulge will apply extra pressure to different parts of the sealing thereby forcing any trapped air to move. The end result is surprisingly that most air is removed from the sealing by using the pressure unit according to the invention.

The first and second bulge may have a profile comprising a curvature to try to affect the direction of movement of air trapped in the sealing. It is preferred to move the air out of the sealing but not into the package. With a top sealing any trapped air should preferably be moved in the bottom-to-top direction and with a bottom sealing any trapped air should preferably be moved in the top-to-bottom direction.

The first and second bulge may have a radius of between 0.3 mm and 1.5 mm, preferably about 0.7 mm.

The curvature of the first bulge may differ from said curvature of the second bulge. The reason could e.g. be to apply a different amount of pressure from different bulges.

The curvature of the second bulge may be wider than the first bulge.

The pressure unit may further comprising one or more additional pressure rollers and anvil rollers arranged in the same way as and further downstream of the first pressure roller and the first anvil roller, and the second pressure roller and the second anvil roller, in the travelling direction.

The bulges of the pressure rollers, arranged downstream of the first pressure roller in the travelling direction, may be arranged with a subsequently increasing offset in relation to the first bulge of the first pressure roller. In that way the bulges will be spread out in the offset direction so as to affect all portions of the sealing. The bulges could e.g. be placed with an increasing offset in a step-like fashion to stepwise move trapped air upwards (for a bottom sealing) and away from the interior of the package.

The bulges of the pressure rollers, arranged downstream of the first pressure roller in the travelling direction, may be arranged with a subsequently increasing or subsequently decreasing width in relation to said first bulge of said first pressure roller. This is an alternative way to affect any trapped air. A first thin bulge could e.g. be placed at the bottom of a pressure roller so as to apply pressure close to the package interior. The bulge of the next pressure roller could be wider, also placed at the bottom of the pressure roller. The succeeding pressure roller rollers could then have wider and wider bulges placed at the bottom of the pressure roller until the last roller has a bulge that is as wide as the roller.

According to a second aspect, the objects are achieved in full, or at least in part, by a filling machine for filling a package with a food product, comprising an inductor device having a coil conductor which interact with the package, and arranged downstream of said inductor device, wherein the filling machine further comprises a pressure unit according to the first aspect of the invention.

According to a third aspect, the objects are achieved in full, or at least in part, by a package containing a food product, wherein the package has been sealed using said pressure unit according to the first aspect of the invention, or filled using the filling machine according to the second aspect of the invention.

According to a fourth aspect, the objects are achieved in full, or at least in part, by a method for sealing a package for a food product, comprising feeding said package through an inductor device which interact with the package to melt at least one layer in a portion of said package, feeding the package through a pressure unit according to the first aspect of the invention to provide a pressure on at least a first section of the portion and thereafter on a second section of the upper portion. The first section and second section corresponds to bulges of different height of different pressure rollers. The portion may be an upper portion or a lower portion of the package.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION OF PREFERRED EMBODIMENTS OF THE INVENTION

Figure 1:
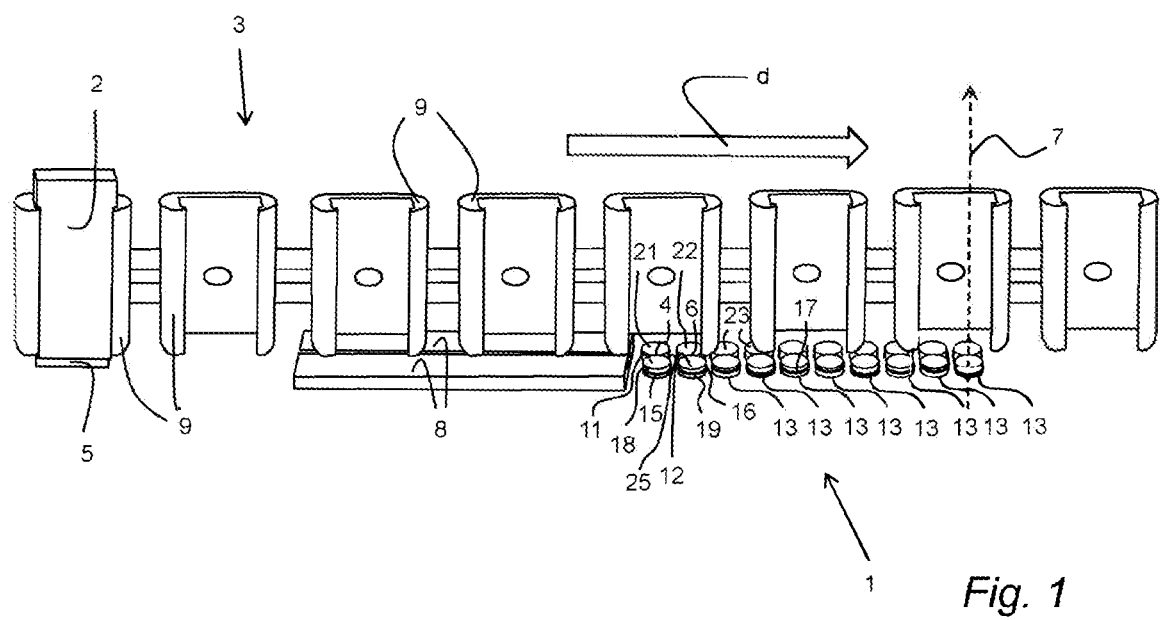
FIG. 1 is a perspective view of a part of a filling machine showing an induction sealing device with a pressure unit according to the invention.

FIG. 1 is a perspective view of a part of a filling machine showing an induction sealing device with a pressure unit according to the invention. A package 2 is held by a package holder 9 and conveyed by the conveyor 3. A portion 5 of the package 2 is conveyed through an inductor device 8 in a direction d where the portion 5 is heated as a first step in sealing the inside of the edges of the package 2 in the portion 5. The heated portion 5 is subsequently moved to a pressure unit 1 where the heated portion is pressurized by a number of pairs of pressure rollers 11, 12, 13 and anvil rollers 21, 22, 23. Each pressure roller 11, 12, 13 applies a pressure onto the portion 5 and on the anvil roller 21, 22, 23 behind the portion 5. The pressure is especially applied by a bulge 15, 16, 17 extending annularly around the otherwise smooth rim surface 18, 19 of the pressure roller 11, 12, 13. The first bulge 15 of the first pressure roller 11 is offset in relation to said second bulge 16 of the second pressure roller 12 in an axial direction 7 of said first pressure roller 11 and said second pressure roller 12. In that way the bulges 15, 16 of the first pressure roller 11 and the second pressure roller 12, respectively, will apply pressure onto different parts of the portion 5 of the package 2. The subsequent pressure rollers 13 are provided with bulges that are also offset. In the embodiment of FIG. 1, the bulges of the pressure rollers, 11, 12, 13 are offset in groups of three, but as mentioned in the summary section above, the configuration of the offset of the bulges may be different as shown in FIG. 2a-2e. The exact configuration is not as important as to facilitate some kind of offset between the bulges of different pressure rollers so that the bulges apply pressure on alternating areas of the portion 5 of the package 2 that is to be sealed. The offset will cause air that is trapped in the sealing to be pressed out creating a better sealing.

Figure 2A:
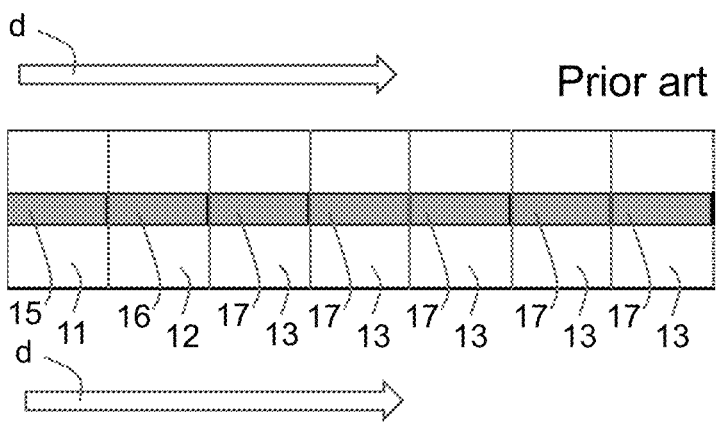
FIG. 2a-e are schematic views of different offset settings of the bulges of the pressure rollers of the pressure unit.

FIG. 2a-2e show different configurations of the offset of the bulges 15, 16, 17 of the row of pressure rollers 11, 12, 13. FIG. 2a shows a prior art configuration, i.e. a row of pressure rollers with bulges without any offset between the rollers. The arrow d indicates the direction of movement of the package 2 and the portion 5 that is to be sealed and is the same direction as the direction d in FIG. 1.

Figure 2B:
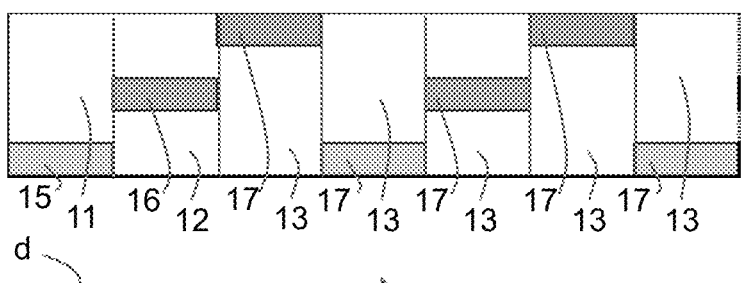

FIG. 2b shows a configuration of bulges 15, 16, 17 offset in the same way as shown in FIG. 1, i.e. groups of three with offset bulges subsequently repeated.

Figure 2C:
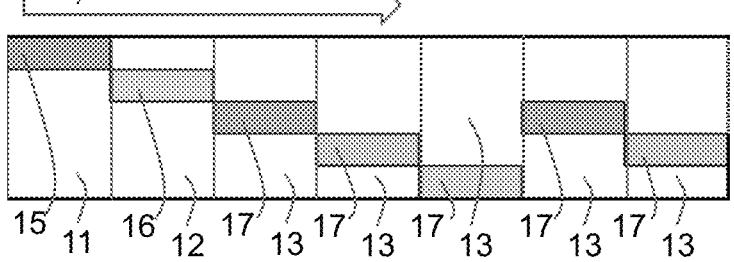

In FIG. 2c a different configuration according to the invention is presented with a group of five bulges 15, 16, 17 with increasing offset to the first bulge 15 of the first pressure roller 11.

Figure 2D:
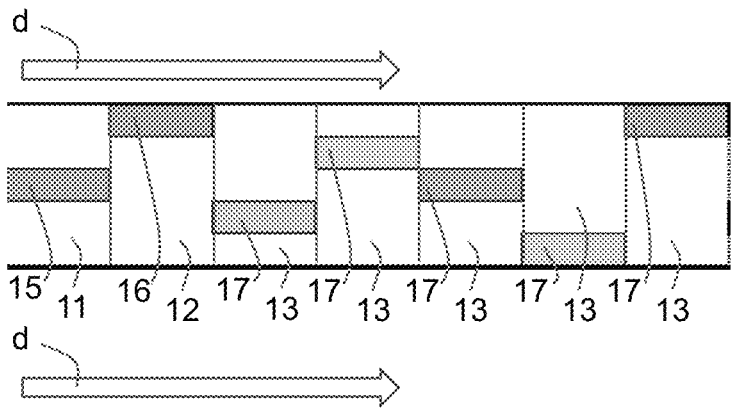

FIG. 2d shows a random configuration with random offset between the bulges 15, 16, 17. It has surprisingly been shown that the effect using a random configuration of the offsets is as good as using an increasing offset as in FIG. 2c or FIG. 2e.

Figure 2E:
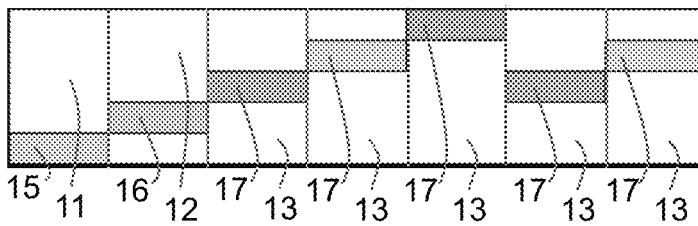

FIG. 2e shows configuration with a group of five bulges 15, 16, 17 with increasing offset to the first bulge 15 of the first pressure roller 11, just as in FIG. 2c but with the direction of the offset inversed to the one in FIG. 2c.

It is understood that other variations in the present invention are contemplated and in some instances, some features of the invention can be employed without a corresponding use of other features. Accordingly, it is appropriate that the appended claims be construed broadly in a manner consistent with the scope of the invention.

For instance, other configurations of the offsets between bulges 15, 16, 17 of different pressure rollers 11, 12, 13 than those shown in FIGS. 2a-2e are possible within the scope of the invention. In fact even a random configuration is sufficient to create large improvements to the prior art solution.

The invention claimed is:

1. A pressure unit for sealing a package for a food product, comprising:
   a conveyor for transporting the package through the pressure unit in a travelling direction;
   a first rotatable pressure roller and a first rotatable anvil roller, the first pressure roller being arranged opposite to the first anvil roller to form a first nip for receiving and rotationally engaging with a portion of the package; and
   a second rotatable pressure roller and a second rotatable anvil roller, both arranged downstream of the first pressure roller and the first anvil roller with respect to the travelling direction, wherein the second pressure roller is arranged opposite to the second anvil roller to form a second nip for receiving and rotationally engaging with the portion of the package, wherein:
      the first pressure roller comprises a first bulge extending annularly around its rim surface;
      the second pressure roller comprises a second bulge extending annularly around its rim surface; and
      the first bulge is offset in relation to the second bulge in an axial direction of the first pressure roller and the second pressure roller;
      wherein bulges of pressure rollers, arranged downstream of the first pressure roller with respect to the travelling direction, are arranged with a subsequently increasing offset in relation to the first bulge of the first pressure roller.

2. The pressure unit according to claim 1, wherein the first bulge and second bulge has a profile comprising a curvature.

3. The pressure unit according to claim 2, wherein the curvature of the first bulge and second bulge has a radius of between 0.3 mm and 1.5 mm.

4. The pressure unit according to claim 3, wherein the curvature of the first bulge and second bulge has a radius of 0.7 mm.

5. The pressure unit according to claim 2, wherein the curvature of the first bulge differs from the curvature of the second bulge.

6. The pressure unit according to claim 2, wherein the curvature of the second bulge is wider than the first bulge.

7. The pressure unit according to claim 1, further comprising one or more additional pressure rollers with respective bulges and additional anvil rollers, each additional pressure roller arranged opposite of each respective anvil roller, and wherein the additional pressure and anvil rollers are arranged downstream of the first pressure roller and the first anvil roller, and downstream of the second pressure roller and the second anvil roller, with respect to the travelling direction.

8. A package containing a food product, wherein the package has been sealed using the pressure unit according to claim 1.

9. A filling machine for filling a package with a food product, comprising:
   an inductor device having a coil conductor which interact with the package, and
   a pressure unit according to claim 1, arranged downstream of the inductor device.

10. A method for sealing a package for a food product, comprising:
   feeding the package through an inductor device which interacts with the package to melt at least one layer in a portion of the package;
   feeding the package through a pressure unit according to claim 1, to provide a pressure on at least a first section of the portion and thereafter on a second section of the upper portion.

11. The method according to claim 10, wherein the portion is an upper portion or a lower portion of the package.

12. A pressure unit for sealing a package for a food product, comprising:
   a conveyor for transporting the package through the pressure unit in a travelling direction;
   a first rotatable pressure roller and a first rotatable anvil roller, the first pressure roller being arranged opposite to the first anvil roller to form a first nip for receiving and rotationally engaging with a portion of the package; and
   a second rotatable pressure roller and a second rotatable anvil roller, both arranged downstream of the first pressure roller and the first anvil roller with respect to the travelling direction, wherein the second pressure roller is arranged opposite to the second anvil roller to form a second nip for receiving and rotationally engaging with the portion of the package, wherein:
      the first pressure roller comprises a first bulge extending annularly around its rim surface;
      the second pressure roller comprises a second bulge extending annularly around its rim surface; and
      the first bulge is offset in relation to the second bulge in an axial direction of the first pressure roller and the second pressure roller;
      wherein bulges of pressure rollers, arranged downstream of the first pressure roller with respect to the travelling direction, are arranged with a subsequently increasing or subsequently decreasing width in relation to the first bulge of the first pressure roller.

13. The pressure unit according to claim 12, wherein the first bulge and second bulge has a profile comprising a curvature.

14. The pressure unit according to claim 13, wherein the curvature of the first bulge and second bulge has a radius of between 0.3 mm and 1.5 mm.

15. The pressure unit according to claim 14, wherein the curvature of the first bulge and second bulge has a radius of 0.7 mm.

16. The pressure unit according to claim 13, wherein the curvature of the first bulge differs from the curvature of the second bulge.

17. The pressure unit according to claim 13, wherein the curvature of the second bulge is wider than the first bulge.

18. The pressure unit according to claim 12, further comprising one or more additional pressure rollers with respective bulges and additional anvil rollers, each additional pressure roller arranged opposite of each respective anvil roller, and wherein the additional pressure and anvil rollers are arranged downstream of the first pressure roller and the first anvil roller, and downstream of the second pressure roller and the second anvil roller, with respect to the travelling direction.

19. A filling machine for filling a package with a food product, comprising:
   an inductor device having a coil conductor which interact with the package, and a pressure unit according to claim 12, arranged downstream of the inductor device.

\* \* \* \* \*